United States Patent
Ding et al.

(10) Patent No.: US 9,344,575 B2
(45) Date of Patent: May 17, 2016

(54) VOICE MESSAGE SENDING METHOD AND SYSTEM, AND CONVERGED MESSAGE SERVER AND CLIENT

(71) Applicant: ZTE Corporation, Shenzhen, Guangdong (CN)

(72) Inventors: Xin Ding, Shenzhen (CN); Yan Lu, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 14/387,446

(22) PCT Filed: Apr. 8, 2013

(86) PCT No.: PCT/CN2013/073905
§ 371 (c)(1),
(2) Date: Sep. 23, 2014

(87) PCT Pub. No.: WO2013/152702
PCT Pub. Date: Oct. 17, 2013

(65) Prior Publication Data
US 2015/0094033 A1  Apr. 2, 2015

(30) Foreign Application Priority Data

Apr. 10, 2012 (CN) .......................... 2012 1 0103533

(51) Int. Cl.
*H04M 1/725* (2006.01)
*H04M 3/533* (2006.01)
(Continued)

(52) U.S. Cl.
CPC ............ *H04M 3/53333* (2013.01); *H04W 4/12* (2013.01); *H04W 4/16* (2013.01); *H04W 4/18* (2013.01)

(58) Field of Classification Search
CPC ....................................................... H04M 3/533
USPC ........................................................ 455/412.1
See application file for complete search history.

(56) References Cited

U.S. PATENT DOCUMENTS 7,123,695 B2 * 10/2006 Malik .................. 379/88.13
7,292,679 B2    11/2007 Darsin
(Continued)

FOREIGN PATENT DOCUMENTS

CN     1848819 A    10/2006
CN   100499714 C    6/2009
(Continued)

OTHER PUBLICATIONS

International Search Report in international application No. PCT/CN2013/073907, mailed on Jul. 11, 2013.
(Continued)

*Primary Examiner* — Santiago Garcia
(74) *Attorney, Agent, or Firm* — Oppedahl Patent Law Firm LLC

(57) ABSTRACT

A voice message sending method is provided which includes that: a converged message client of a sender initiates a session invitation which carries voice message receiver information and indicates that the session is to send a voice message; a media transmission link is established between the converged message client of the sender and a converged message server of a receiver; the converged message client of the sender sends a voice message to the converged message server of the receiver through the media transmission link; and the converged message server of the receiver stores the voice message in the message storage server to which a receiver user attributed for the converged message client of the receiver to acquire the voice message. A voice message sending system, a converged message server and a converged message client are also accordingly provided. The present application enables a user to simultaneously enjoy a converged message service and a voice message, thereby providing excellent user experience.

6 Claims, 6 Drawing Sheets

(51) Int. Cl.
  *H04W 4/16* (2009.01)
  *H04W 4/12* (2009.01)
  *H04W 4/18* (2009.01)

(56) References Cited

U.S. PATENT DOCUMENTS

| | | | |
|---|---|---|---|
| 8,060,621 B2 | 11/2011 | Lee et al. | |
| 8,224,288 B1 | 7/2012 | Karam | |
| 8,284,773 B1 | 10/2012 | Woleben | |
| 8,374,326 B2 | 2/2013 | Shi | |
| 8,750,837 B2* | 6/2014 | Gandhi et al. | 455/413 |
| 8,761,355 B2* | 6/2014 | Reding et al. | 379/88.12 |
| 2004/0121762 A1* | 6/2004 | Chou et al. | 455/413 |
| 2005/0018821 A1 | 1/2005 | Darsin | |
| 2006/0030297 A1* | 2/2006 | Coble et al. | 455/412.1 |
| 2006/0166650 A1* | 7/2006 | Berger et al. | 455/412.1 |
| 2008/0043969 A1 | 2/2008 | Shi | |
| 2008/0089324 A1 | 4/2008 | Polk | |
| 2008/0114881 A1 | 5/2008 | Lee et al. | |
| 2008/0160962 A1* | 7/2008 | Hao | 455/412.1 |
| 2009/0271469 A1 | 10/2009 | Benco | |
| 2009/0279455 A1 | 11/2009 | Wang et al. | |
| 2010/0056109 A1* | 3/2010 | Wilson et al. | 455/412.1 |
| 2010/0197278 A1* | 8/2010 | Anderl | 455/412.1 |
| 2011/0034151 A1 | 2/2011 | Brouwer | |
| 2012/0011260 A1 | 1/2012 | Lu et al. | |
| 2012/0128145 A1 | 5/2012 | Shi | |
| 2012/0166562 A1 | 6/2012 | Lu et al. | |
| 2013/0282850 A1* | 10/2013 | Lu et al. | 709/206 |
| 2014/0057605 A1* | 2/2014 | Vendrow et al. | 455/412.1 |
| 2015/0072657 A1* | 3/2015 | Lu et al. | 455/412.2 |
| 2015/0094033 A1 | 4/2015 | Ding et al. | |

FOREIGN PATENT DOCUMENTS

| | | |
|---|---|---|
| CN | 101854597 A | 10/2010 |
| CN | 102026109 A | 4/2011 |
| CN | 102256216 A | 11/2011 |
| CN | 102291693 A | 12/2011 |
| EP | 2124399 A1 | 11/2009 |
| EP | 2824949 A1 | 1/2015 |
| WO | 2008060084 A1 | 5/2008 |
| WO | 2009082097 A1 | 7/2009 |
| WO | 2013152702 A1 | 10/2013 |

OTHER PUBLICATIONS

English Translation of the Written Opinion of the International Search Authority in international application No. PCT/CN2013/073907, mailed on Jul. 11, 2013.
International Search Report in international application No. PCT/CN2013/073905, mailed on Jul. 18, 2013. (2 pages—see entire document).
English Translation of the Written Opinion of the International Search Authority in international application No. PCT/CN2013/073905, mailed on Jul. 18, 2013. (5 pages—see entire document).
Supplementary European Search Report in European application No. 13775483.4, mailed on Feb. 3, 2015. (6 pages—see entire document).
"Converged IP Messaging Requirements", OMA-RD-CPM-V1_0-20070111-D, No. Draft Version 1.0, Jan. 11, 2007, XP002558898, Retrieved from the Internet: URL: http://member.openmobilealliance.org/ftp/public_documents/req/REQ-CPM/Permanent_documents/ [retrieved on Dec. 2, 2009]. (48 pages—see Supplementary European Search Report in European application No. 13775483.4 for relevant pages).

* cited by examiner

VOICE MESSAGE SENDING METHOD AND SYSTEM, AND CONVERGED MESSAGE SERVER AND CLIENT

TECHNICAL FIELD

The present application relates to the field of communications, and more particularly to a voice message sending method, a voice message sending system, a converged message server and a converged message client.

BACKGROUND

Converged message service is a new message service which has been developed in recent years. The purpose of developing such service is to realize the interworking and convergence of a plurality of kinds of message services so as to provide a unified message service and bring consistent and convenient message service experience for users. The relatively typical converged message service that is currently available is the Converged IP Messaging (CPM) service provided by the Open Mobile Alliance (OMA). The CPM converges a plurality of kinds of existing message services, including Instant Message (IM), Push-To-Talk over Cellular (POC), Mobile E-mail (MEM), Short Messaging Service (SMS), Multimedia Messaging Service (MMS) and so on.

However, the existing system for converged message service takes no consideration of the convergence or interworking with a voice mail service. An IP-based voice mail service enables a user to record a voice message anytime and anywhere, send the recorded voice message to another user and conduct a visual management on the voice messages stored like on an e-mail. For its convenient use and excellent user experience, the service has been becoming increasingly popular. If a voice mail service can be converged with existing converged message service to enable a converged message service user to receive/send and manage a voice message using a converged message service system, then user experience can be undoubtedly improved further.

SUMMARY

In view of this, the present application provides a voice message sending method, a voice message sending system, a converged message server and a converged message client so as to address the problem that existing technologies are incapable of sending/receiving or managing a voice message using a converged message service system and are therefore undermined in user experience.

To this end, the technical solutions of the present application are implemented as follows:

A voice message sending method includes that:

a converged message client of a sender initiates a session invitation which carries voice message receiver information and indicates that the session is sending of a voice message;

the converged message client of the sender, a converged message server of the sender and a converged message server of a receiver negotiate with each other to establish a media transmission link between the converged message client of the sender and the converged message server of the receiver;

the converged message client of the sender sends a voice message to the converged message server of the receiver through the media transmission link;

after receiving the voice message, the converged message server of the receiver stores the voice message in the message storage server to which a receiver user pertains; and the converged message client of the receiver acquires the voice message from the message storage server.

The voice message receiver information contained in the session invitation may be a user identifier.

Establishing a media transmission link between the converged message client of the sender and the converged message server of the receiver may be: establishing a media transmission link between the converged message client of the sender and the converged message server of the sender, and establishing a media transmission link between the converged message server of the sender and the converged message server of the receiver corresponding to the voice message receiver information.

The voice message receiver information contained in the session invitation is a group identifier or the user identifier of each user in a group.

Establishing a media transmission link between the converged message client of the sender and the converged message server of the receiver may be: establishing a media transmission link between the converged message client of the sender and the converged message server of the sender, establishing a media transmission link between the converged message server of the sender and a group control server, and establishing a media transmission link between the group control server and the converged message server of the receiver corresponding to the voice message receiver information.

The method may further include a step that: the message storage server sends a notice message to the receiver user after storing the voice message.

A converged message server includes a media transmission link establishment unit, a voice message receiving unit and a voice message forwarding unit, wherein the media transmission link establishment unit is configured to negotiate, after a converged message client of a sender initiates a session invitation, with the converged message client of the sender and a converged message server of a receiver to separately establish a media transmission link with the converged message client of the sender and a media transmission link with the converged message server of the receiver, wherein the session invitation contains voice message receiver information and indicating that the session is sending of a voice message;

the voice message receiving unit is configured to receive a voice message sent from the converged message client of the sender through the media transmission link; and the voice message forwarding unit is configured to forward the voice message received by the voice message receiving unit to the converged message server of the receiver.

A converged message client includes a session invitation initiation unit, a media transmission link establishment unit and a voice message sending unit, wherein the session invitation initiation unit is configured to initiate a session invitation which contains voice message receiver information and indicates that the session is sending of a voice message;

the media transmission link establishment unit is configured to negotiate with a converged message server of a sender to establish a media transmission link with the converged message server of the sender; and the voice message sending unit is configured to send a voice message to the converged message server of the sender through the media transmission link established by the media transmission link establishment unit.

A voice message sending system includes: a converged message client of a sender, a converged message server of the sender, a converged message server of a receiver, a message storage server and a converged message client of the receiver, wherein the converged message client of the sender is the foregoing converged message client;

the converged message server of the sender the foregoing converged message server;

the converged message server of the receiver is configured to establish a media transmission link with the converged message server of the sender, receive a voice message sent by the converged message server of the sender through the media transmission link and store the voice message in the message storage server to which the converged message client of the receiver pertains;

the message storage server is configured to store the voice message;

the converged message client of the receiver is configured to acquire the voice message from the message storage server; and the converged message server of the receiver is specifically configured to directly establish a media transmission link with the converged message server of the sender or indirectly establish a media transmission link with the converged message server of the sender through a group control server.

The message storage server may be further configured to send a notice message to a receiver user after storing the voice message.

According to the voice message sending method, the voice message sending system, the converged message server and the converged message client disclosed in embodiments of the present application, a converged message client of a sender initiates a session invitation which carries voice message receiver information and indicates that the session is to send a voice message; the converged message client of the sender, a converged message server of the sender and a converged message server of a receiver negotiate with each other to establish a media transmission link between the converged message client of the sender and the converged message server of the receiver; the converged message client of the sender sends a voice message to the converged message server of the receiver through the media transmission link; after receiving the voice message, the converged message server of the receiver stores the voice message in the message storage server to which a receiver user pertains; and the converged message client of the receiver acquires the voice message from the message storage server. The solutions provided herein enable a user to simultaneously enjoy a converged message service and a voice service by enabling the user to send a recorded voice message to the message storage server/servers of one or more receivers using a converged message service system for the receivers to download and play the voice message, thus providing excellent user experience.

DETAILED DESCRIPTION

The present application describes that the converged message client of a sender initiates a session invitation which carries voice message receiver information and indicates that the session is to send a voice message; the converged message client of the sender, the converged message server of the sender and the converged message server of a receiver negotiate with each other to establish a media transmission link between the converged message client of the sender and the converged message server of the receiver; the converged message client of the sender sends a voice message to the converged message server of the receiver through the media transmission link; after receiving the voice message, the converged message server of the receiver stores the voice message in the message storage server of a user at the receiving side; and the converged message client of the receiver acquires the voice message from the message storage server.

Figure 1:
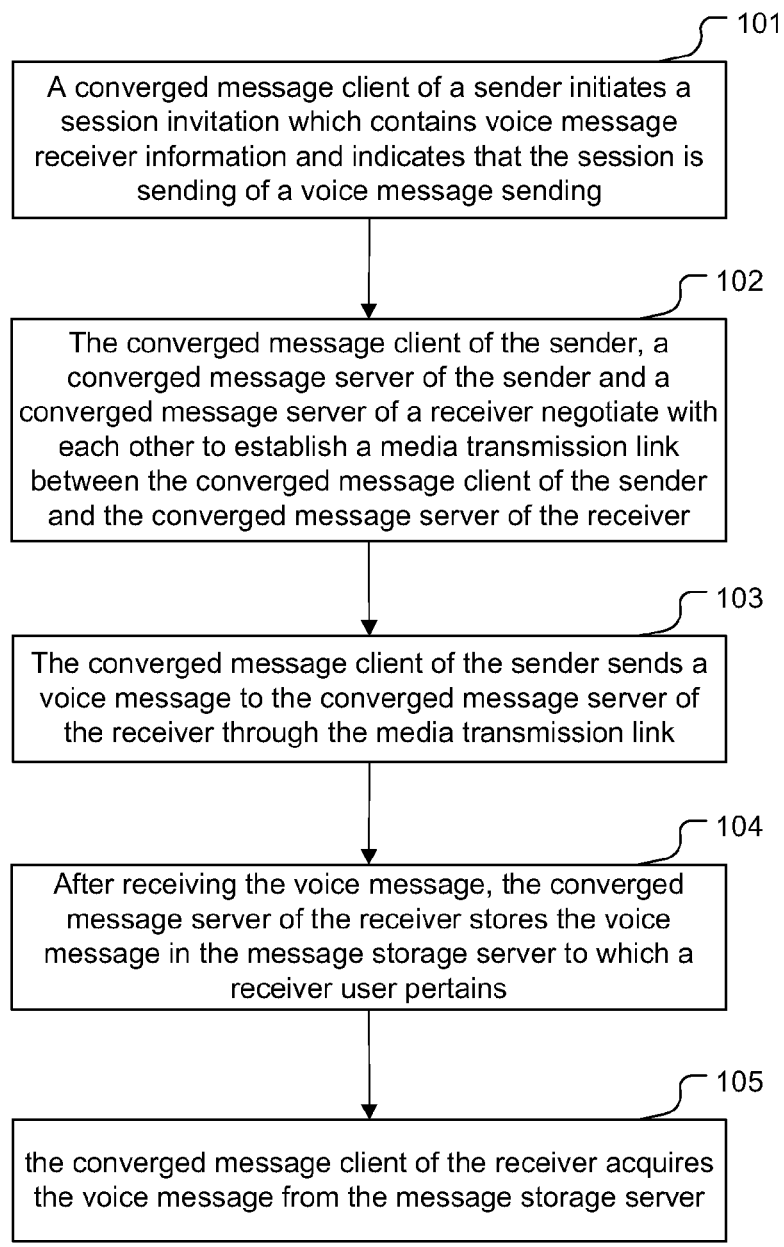
FIG. 1 is a flowchart schematically illustrating the flow of a voice message sending method according to an embodiment of the present application.

FIG. 1 is a flowchart schematically illustrating the flow of a voice message sending method according to an embodiment of the present application, and as shown in FIG. 1, the method includes the following steps:

Step 101: a converged message client of a sender initiates a session invitation which carries voice message receiver information and indicates that the session is to send a voice message;

Step 102: the converged message client of the sender, a converged message server of the sender and a converged message server of a receiver negotiate with each other to establish a media transmission link between the converged message client of the sender and the converged message server of the receiver;

Step 103: the converged message client of the sender sends a voice message to the converged message server of the receiver through the media transmission link;

Step 104: after receiving the voice message, the converged message server of the receiver stores the voice message in the message storage server to which a user at the receiving side belongs; and Step 105: the converged message client of the receiver acquires the voice message from the message storage server;

Optionally, in Step 101, after creating a voice message for a user, the converged message client of the sender initiates a session invitation, and the information of the receiver who will receive the voice message ("voice message receiver information" for short), which is contained in the session invitation, is a user identifier; accordingly, in Step 102, establishing a media transmission link between the converged message client of the sender and the converged message server of the receiver includes: establishing a media transmission link between the converged message client of the sender and the converged message server of the sender; and establishing a media transmission link between the converged message server of the sender and the converged message server of the receiver corresponding to the voice message receiver information; specifically, a signaling interaction is carried out among the converged message client of the sender, the converged message server of the sender and the converged message server of a receiver, and media transmission links are established between the converged message client of the sender and the converged message server of the sender and between the converged message server of the sender and the converged message server of the receiver, respectively. Accordingly, in Step 103, the converged message client of the sender sends the voice message through the established media transmission link; the converged message server of the sender receives the voice message and forwards the voice message to the receiver through the established media transmission link; and the converged message server of the receiver receives the voice message.

Optionally, in Step 101, after creating a voice message for a user, the converged message client of the sender initiates a session invitation, and the voice message receiver information contained in the session invitation is a group identifier or a user identifier of each user in a group; accordingly, in Step 102, establishing a media transmission link between the converged message client of the sender and the converged message server of the receiver includes: establishing a media transmission link between the converged message client of the sender and the converged message server of the sender; establishing a media transmission link between the converged message server of the sender and a group control server; and establishing a media transmission link between the group control server and the converged message server of the receiver corresponding to the voice message receiver information; specifically, a signaling interaction is carried out among the converged message client of the sender, the converged message server of the sender, the group control server and the converged message server to which each user at the receiving side belongs, and media transmission links are established between the converged message client of the sender and the converged message server of the sender, between the converged message server of the sender and the group control server and between the group control server and the converged message server of each receiver, respectively. Accordingly, in Step 103, the converged message client of the sender sends the voice message through the established media transmission link; the converged message server of the sender receives the voice message and forwards the voice message through the established media transmission link; the group control server receives the voice message and sends the received voice message through each media transmission link established with the converged message server of a receiver; and the converged message server of each receiver separately receives the voice message.

Optionally, after storing the voice message, the message storage server sends a notice message to the receiver user, and the user equipment of the receiver acquires the voice message from the message storage server and plays the voice message for the user.

Figure 2:
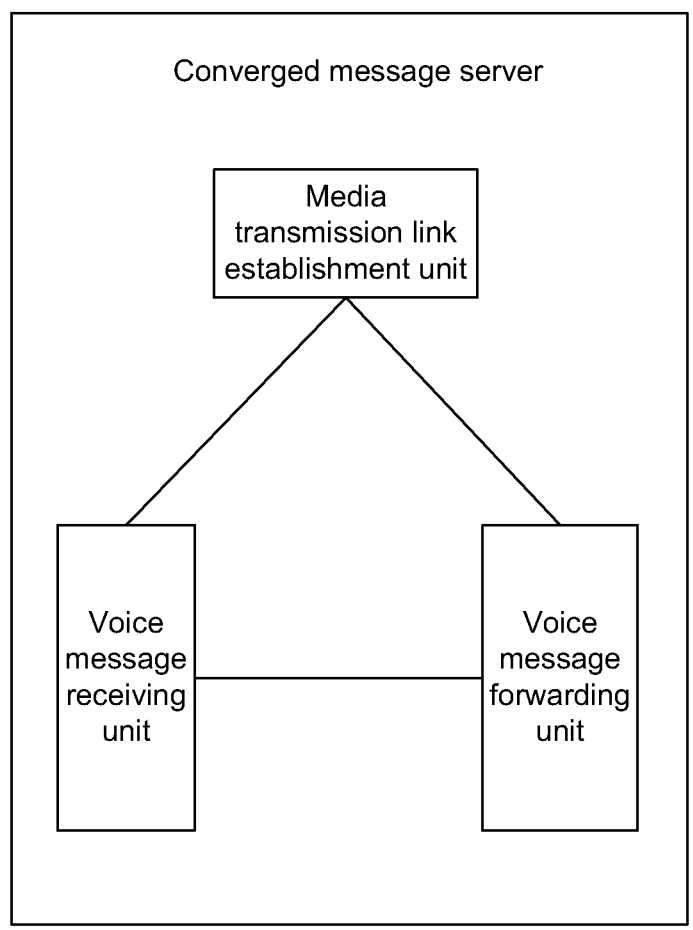
FIG. 2 is a schematic diagram illustrating the structure of a converged message server according to an embodiment of the present application.

A converged message server is accordingly provided in an embodiment of the present application which, as shown in FIG. 2, includes a media transmission link establishment unit, a voice message receiving unit and a voice message forwarding unit, wherein the media transmission link establishment unit is configured to negotiate, after the converged message client of a sender initiates a session invitation, with the converged message client of the sender and the converged message server of a receiver to separately establish a media transmission link with the converged message client of the sender and a media transmission link with the converged message server of the receiver, wherein the session invitation carries voice message receiver information and indicates that the session is to send a voice message;

the voice message receiving unit is configured to receive a voice message sent from the converged message client of the sender through the media transmission link; and the voice message forwarding unit is configured to forward the voice message received by the voice message receiving unit to the converged message server of the receiver.

Figure 3:
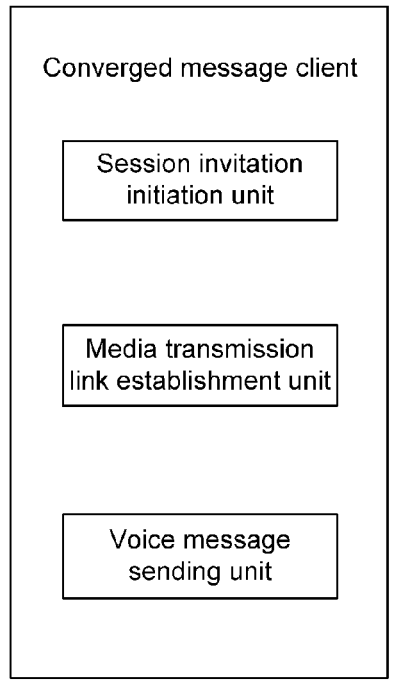
FIG. 3 is a schematic diagram illustrating the structure of a converged message client according to an embodiment of the present application.

A converged message client is accordingly provided in an embodiment of the present application which, as shown in FIG. 3, includes a session invitation initiation unit, a media transmission link establishment unit and a voice message sending unit, wherein the session invitation initiation unit is configured to initiate a session invitation which contains voice message receiver information and indicates that the session is to send a voice message;

the media transmission link establishment unit is configured to negotiate with the converged message server of a sender to establish a media transmission link with the converged message server of the sender; and the voice message sending unit is configured to send a voice message to the converged message server of the sender through the media transmission link established by the media transmission link establishment unit.

Figure 4:
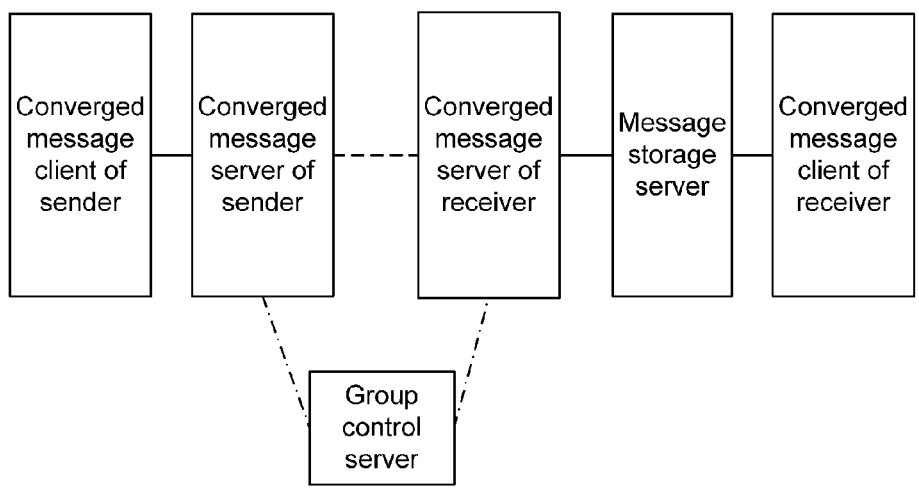
FIG. 4 is a schematic diagram illustrating the structure of a voice message sending system according to an embodiment of the present application.

A voice message sending system is accordingly provided in an embodiment of the present application which, as shown in FIG. 4, includes: the converged message client of a sender, the converged message server of the sender, the converged message server of a receiver, a message storage server and the converged message client of the receiver, wherein the converged message client of the sender is the foregoing converged message client;

the converged message server of the sender is the foregoing converged message server;

the converged message server of the receiver is configured to establish a media transmission link with the converged message server of the sender, receive a voice message sent by the converged message server of the sender through the media transmission link and store the voice message in the message storage server to which the converged message client of the receiver pertains;

the message storage server is configured to store the voice message; and the converged message client of the receiver is configured to acquire the voice message from the message storage server;

It should be noted that the converged message server of the receiver is specifically configured to directly establish a media transmission link with the converged message server of the sender, alternatively, the system further includes a converged message server and the converged message server of the receiver is specifically configured to indirectly establish a media transmission link with the converged message server of the sender through the group control server.

The message storage server is also configured to send a notice message to a receiver user after storing the voice message.

It should be noted that in the present application, the converged message server of the sender and the converged message server of the receiver may be the same server or servers independent from each other.

The technical solutions of the present application are set forth below in detail with reference to accompanying drawings when read in conjunction with specific embodiments.

Embodiment 1

In the embodiment, a converged message service user sends a created voice message to another converged message service user. Specifically, After creating a voice message for a user, the converged message client of a sender initiates a session invitation which carries the identifier of the receiver of the voice message and indicates that the session is sending of a voice message; a signaling interaction is carried out among the converged message client of the sender, the converged message server of the sender and the converged message server of a receiver, and media transmission links are established between the converged message client of the sender and the converged message server of the sender and between the converged message server of the sender and the converged message server of the receiver, respectively; the converged message client of the sender sends the voice message through the established media transmission link; the converged message server of the sender receives the voice message and forwards the voice message to the receiver through the established media transmission link; the converged message server of the receiver receives the voice message and stores the received voice message in the message storage server to which a receiver user belongs; the message storage server sends a notice to the receiver user, and the user equipment of the receiver acquires the voice message from the message storage server and plays the voice message for the user.

Figure 5:
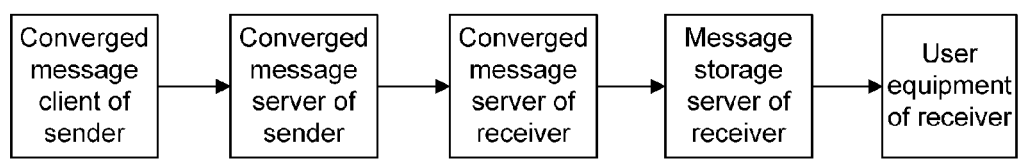
FIG. 5 is a schematic diagram illustrating a system architecture according to embodiment 1.

As shown in FIG. 5, the system architecture of the embodiment includes: the converged message client of a sender, the converged message server of the sender, the converged message server of a receiver, the message storage server of the receiver and the user equipment of the receiver.

Figure 6:
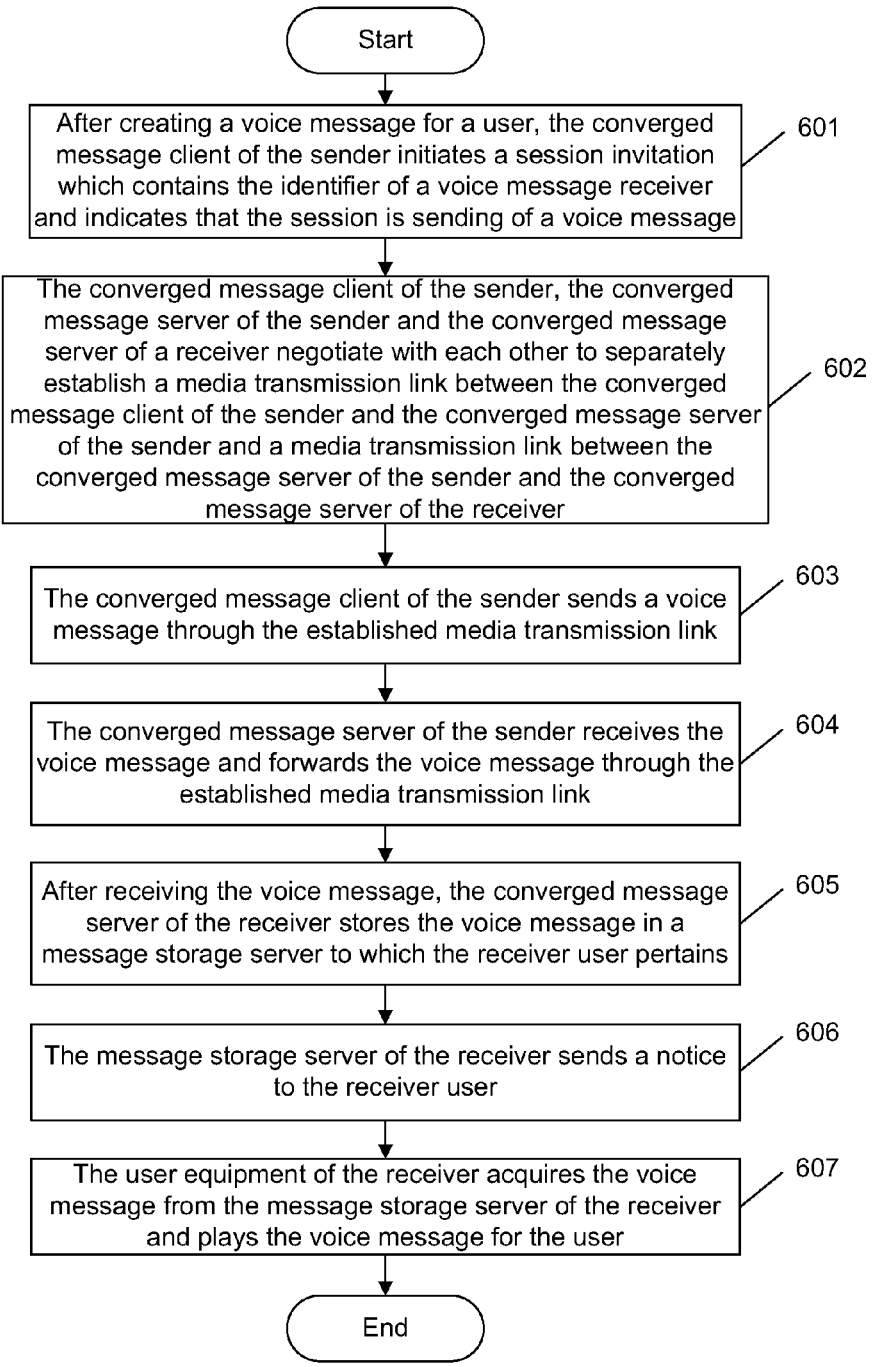
FIG. 6 is a schematic diagram illustrating a signaling flow according to embodiment 1.

As shown in FIG. 6, the signaling flow of the embodiment specifically includes the following steps:

Step 601: after creating a voice message for a user, the converged message client of the sender initiates a session invitation which carries the identifier of a voice message receiver and indicates that the session is sending of a voice message;

the converged message client of the sender can make an audio record for a user at the scene or allow the user to select a stored audio file or add another attachment using existing technologies;

a signal may be sent or received in a converged message service system using a Session Initiation Protocol (SIP); in Step 601, the session invitation may be sent through an SIP INVITE request and the Request-URI parameter of the SIP INVITE request may be set as a receiver user identifier, meanwhile, it is indicated in the Header or the body of the SIP INVITE request that the purpose of the current session is to send a voice message (or the destination of the current section is a voice message supporting user), for example, a Feature Tag for implementing the solution may be added in an Accept-Contact Header Field, or corresponding session attributes may be set in the Session Description Protocol (SDP) message body of the INVITE message;

Step 602: the converged message client of the sender, the converged message server of the sender and the converged message server of a receiver negotiate with each other to separately establish a media transmission link between the converged message client of the sender and the converged message server of the sender and a media transmission link between the converged message server of the sender and the converged message server of the receiver;

take SIP as an example, after receiving the SIP INVITE request generated in the previous step, the converged message server of the sender forwards the request according to the receiver user identifier contained in the SIP INVITE request; after receiving the request, the converged message server of the receiver acquires the receiver user identifier carried by the request and learns that the current session is to send a voice message and then returns an SIP 200 OK response; the response is returned to the converged message client of the sender by the converged message server of the sender; and the converged message client of the sender returns an SIP ACK message at last;

the network entities complete a media parameter negotiation while carrying out the foregoing signaling interaction and establish a media transmission link according to the result of the negotiation, for example, the network entities establish a Message Session Relay Protocol (MSRP) media transmission link according to an MSRP;

Step 603: the converged message client of the sender sends the voice message through the established media transmission link;

take MSRP as an example, the converged message client of the sender sends, through an established MRSP media transmission link, an MSRP SEND request in which the voice message is carried;

Step 604: the converged message server of the sender receives the voice message and forwards the voice message through the established media transmission link;

take MSRP as an example, after receiving the MSRP SEND request, the converged message server of the sender forwards the MSRP SEND request through the established MSRP link;

Step 605: after receiving the voice message, the converged message server of the receiver stores the voice message in a message storage server to which the receiver user pertains;

take MSRP as an example, after receiving the MSRP SEND request, the converged message server of the receiver acquires the voice message carried in the MSRP SEND request and sequentially stores the voice message in the message storage server of the receiver using the APPEND instruction of Internet Message Access Protocol (I MAP);

Step 606: the message storage server of the receiver sends a notice to the receiver user to inform the receiver user that the new voice message is received;

after generating the notice message, the message storage server of the receiver sends the generated notice message to the receiver user using an SMS or other currently available services;

Step 607: after receiving the notice message, the user equipment of the receiver acquires the voice message from the message storage server of the receiver and plays the voice message for the user;

the user equipment of the receiver may acquire the voice message from the message storage server of the receiver using the FETCH instruction of IMAP.

Embodiment 2

In the embodiment, a converged message service user sends a created voice message to a converged message service user group (that is, a plurality of converged message service users). Specifically, after creating a voice message for a user, the converged message client of a sender initiates a session invitation which carries a group identifier or the identifier of each user in the group and indicates that the current session is to send a voice message; a signaling interaction is carried out among the converged message client of the sender, the converged message server of the sender, a group control server and the converged message server to which each receiver user belongs, and media transmission links are established between the converged message client of the sender and the converged message server of the sender, between the converged message server of the sender and the group control server and between the group control server and the converged message server of each receiver, respectively; the converged message client of the sender sends the voice message through the established media transmission link; the converged message server of the sender receives the voice message and forwards the voice message through the established media transmission link; the group control server receives the voice message and forwards the received voice message through each media transmission link with the converged message server of a receiver; and the converged message server of each receiver separately receives the voice message, stores the received voice message in the message storage server to which a receiver user pertains; the message storage server sends a notice to a corresponding receiver user, and the equipment of each receiver user acquires the voice message from the message storage server to which the each user belongs and plays the voice message for the each user.

Figure 7:
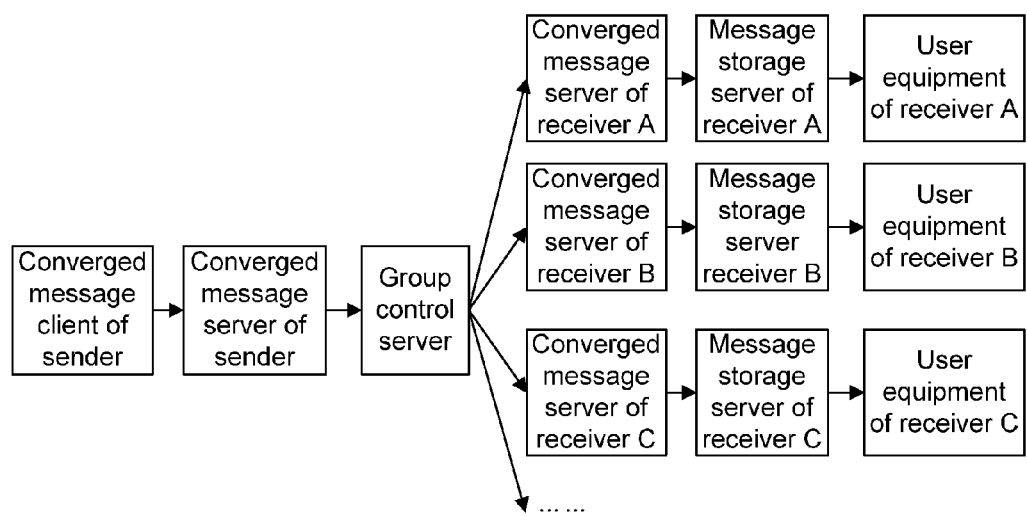
FIG. 7 is a schematic diagram illustrating a system architecture according to embodiment 2.

As shown in FIG. 7, the system architecture of the embodiment includes: a converged message client of a sender, a converged message server of the sender, a group control server, a converged message server of each receiver to which a receiver user pertains, a message storage server of the receiver to which each receiver user belongs, and user equipment of each receiver user.

Figure 8:
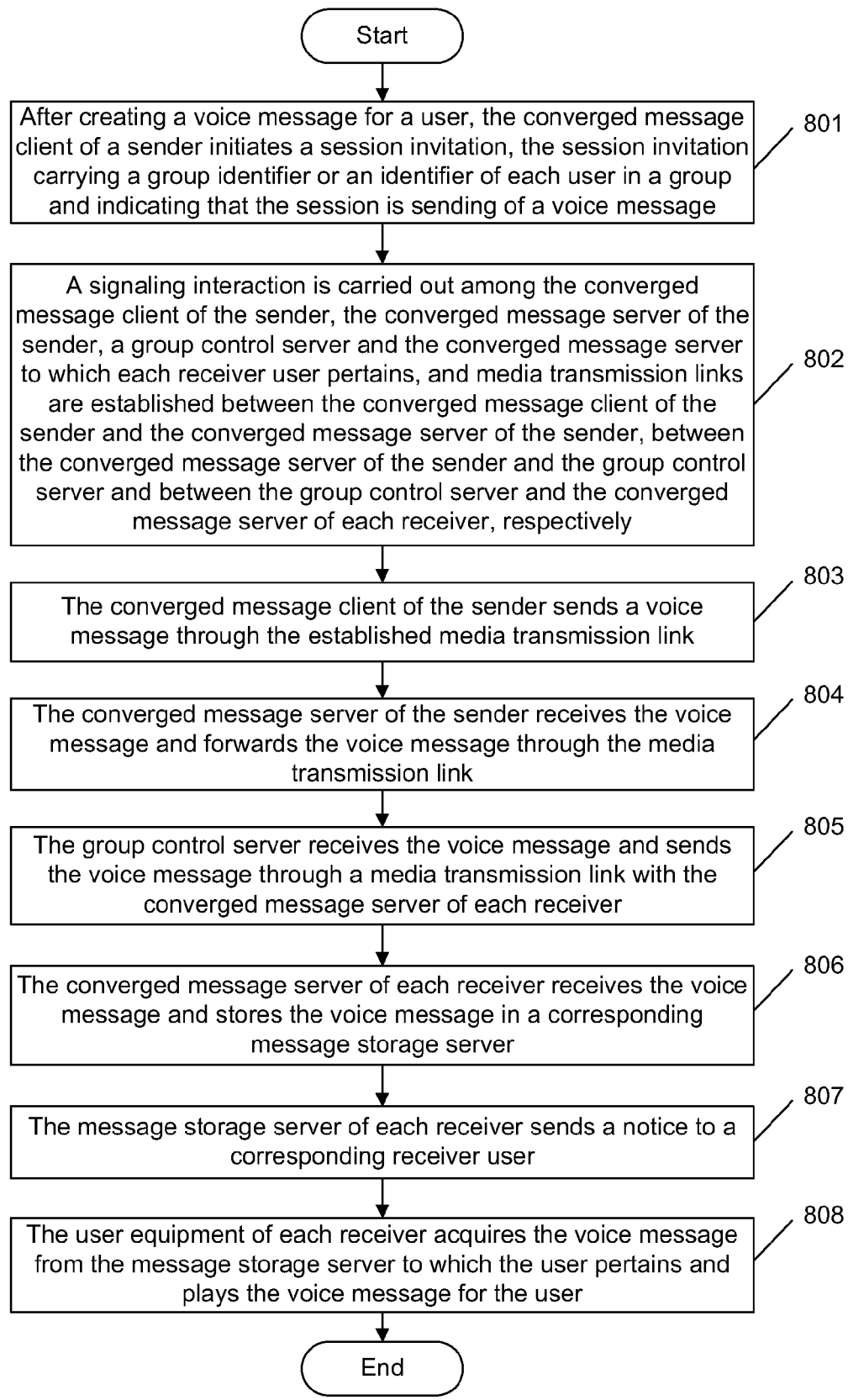
FIG. 8 is a schematic diagram illustrating a signaling flow according to embodiment 2.

As shown in FIG. 8, the signaling flow of the embodiment specifically includes the following steps:

Step 801: after creating a voice message for a user, the converged message client of the sender initiates a session invitation, the session invitation carrying a group identifier or the identifier of each user in a group and indicating that the session is to send a voice message;

the converged message client of the sender may make an audio record for a user at the scene or allow the user to select a stored audio file or add another attachment using existing technologies.

In the step, take SIP as an example, the session invitation may be sent through an SIP INVITE request and the Request-URI parameter of the SIP INVITE may be set as the identifier of a receiver user group or the identifier of a group control server (in the latter case, the identifier of each receiver user should be listed in the message body), meanwhile, it is indicated in the Header or body of the SIP INVITE request that the purpose of the current session is to send a voice message (or the destination of the current section is a voice message supporting user), for example, a Feature Tag for implementing the solution may be added in an Accept-Contact Header Field, or corresponding session attributes may be set in the SDP message body of the INVITE message.

Step 802: a signaling interaction is carried out among the converged message client of the sender, the converged message server of the sender, the group control server and the converged message server to which each receiver user belongs, and media transmission links are established between the converged message client of the sender and the converged message server of the sender, between the converged message server of the sender and the group control server and between the group control server and the converged message server of each receiver, respectively.

Take SIP as an example, after receiving the SIP INVITE request generated in the previous step, the converged message server of the sender forwards the request according to the identifier of the receiver user group or of the group control server carried in the SIP INVITE request; after receiving the request, the group control server forwards the INVITE request to each receiver according to the group identifier or each receiver user identifier carried in the request; after receiving the request, the converged message server of each receiver acquires the receiver user identifier carried in the request and learns that the current session is to send a voice message and then returns an SIP 200 OK response; the response is returned to the converged message client of the sender through the group control server and the converged message server of the sender; and the converged message client of the sender returns an SIP ACK message at last.

The network entities complete media parameter negotiation while carrying out the foregoing signaling interaction and establish media transmission links according to the result of the negotiation, for example, the network entities establish an MSRP media transmission link according to MSRP.

Step 803: the converged message client of the sender sends the voice message through the established media transmission link;

take MSRP as an example, the converged message client of the sender sends, through an established MSRP media transmission link, an MSRP SEND request in which the voice message is carried;

Step 804: the converged message server of the sender receives the voice message and forwards the voice message through the media transmission link;

take MSRP as an example, after receiving the MSRP SEND request, the converged message server of the sender forwards the MSRP SEND request through the established MSRP link;

Step 805: the group control server receives the voice message and forwards the voice message through each media transmission link established with the converged message server of a receiver;

take MSRP as an example, after receiving the MSRP SEND request, the group control server forwards the MSRP SEND request to each receiver through each established MSRP link with the converged message server of a receiver;

Step 806: the converged message server of each receiver respectively receives the voice message and stores the voice message in a corresponding message storage server;

take MSRP as an example, after receiving the MSRP SEND request, the converged message server of each receiver acquires the voice message carried in the MSRP SEND request and sequentially stores the voice message in the message storage server of the receiver using the APPEND instruction of Internet Message Access Protocol (IMAP);

Step 807: the message storage server of each receiver sends a notice to a corresponding receiver user to inform the receiver user that the new voice message is received;

after generating a notice message, the message storage server of each receiver sends the generated notice message to the receiver user via an SMS or other currently available services;

Step 808: after receiving the notice message, the user equipment of each receiver acquires the voice message from the message storage server to which the user pertains and plays the voice message for the user.

The user equipment of each receiver user may acquire the voice message from the message storage server of the receiver using the FETCH instruction of IMAP.

It can be seen that by adopting the solutions provided in the present application, a converged message service user can locally record a voice message and then send the voice message to one or more receivers using a converged message service system, and the receiver can acquire the voice message from the converged message service system and plays the voice message, thus, the present application provides excellent user experience.

The mentioned above is merely embodiments of the present application but is not to be construed as limitation to the protection scope of the present application.

The invention claimed is:

1. A voice message sending method, comprising:

initiating, by a converged message client of a sender, a session invitation which contains voice message receiver information and indicates this session to be voice message sending;

negotiating, by the converged message client of the sender, with the converged message server of the sender to establish a media transmission link with the converged message server of the sender;

sending, by the converged message client of the sender, a voice message to the converged message server of the sender through the media transmission link;

negotiating, by a converged message server of the sender, after the converged message client of the sender initiates the session invitation, with the converged message client of the sender and a converged message server of a receiver to separately establish a media transmission link with the converged message client of the sender and a media transmission link with the converged message server of the receiver, wherein the session invitation contains voice message receiver information and indicates this session to be voice message sending;

receiving, by the converged message client of the sender, the voice message sent from the converged message client of the sender through the media transmission link;

forwarding, by the converged message client of the sender, the voice message to the converged message server of the receiver;

establishing, by the converged message server of the receiver, the media transmission link with the converged message server of the sender;

receiving, by the converged message server of the receiver, the voice message sent by the converged message server of the sender through the media transmission link;

storing, by the converged message server of the receiver, the voice message in a message storage server to which a receiver user pertains after the converged message server of the receiver receives the voice message;

storing, by the message storage server the voice message; and acquiring, by a converged message client of the receiver, the voice message from the message storage server.

2. The method according to claim 1, further comprising: sending, by the message storage server, a notice message to the receiver user after the message storage server stores the voice message.

3. A voice message sending system, comprising: a converged message client of a sender, a converged message server of the sender, a converged message server of a receiver, a message storage server and a converged message client of the receiver, wherein the converged message client of the sender comprises a first processor which is configured to implement a session invitation initiation unit, a media transmission link establishment unit and a voice message sending unit, wherein the session invitation initiation unit is configured to initiate a session invitation which contains voice message receiver information and indicates this session to be voice message sending;

the media transmission link establishment unit is configured to negotiate with the converged message server of the sender to establish a media transmission link with the converged message server of the sender; and the voice message sending unit is configured to send a voice message to the converged message server of the sender through the media transmission link established by the media transmission link establishment unit;

the converged message server of the sender comprises a second processor which is configured to implement a media transmission link establishment unit, a voice message receiving unit and a voice message forwarding unit, wherein:

the media transmission link establishment unit is configured to negotiate, after the converged message client of the sender initiates the session invitation, with the converged message client of the sender and the converged message server of the receiver to separately establish a media transmission link with the converged message client of the sender and a media transmission link with the converged message server of the receiver, wherein the session invitation contains voice message receiver information and indicates this session to be voice message sending;

the voice message receiving unit is configured to receive the voice message sent from the converged message client of the sender through the media transmission link; and the voice message forwarding unit is configured to forward the voice message received by the voice message receiving unit to the converged message server of the receiver;

the converged message server of the receiver comprises a third processor which is configured to:

establish the media transmission link with the converged message server of the sender, receive the voice message sent by the converged message server of the sender through the media transmission link and store the voice message in the message storage server to which the converged message client of the receiver pertains;

the message storage server comprises a memory which is configured to store the voice message; and the converged message client of the receiver comprises a forth processor which is configured to acquire the voice message from the message storage server.

4. The system according to claim 3, wherein the third processor in the converged message server of the receiver is configured to directly establish the media transmission link with the converged message server of the sender or indirectly establish the media transmission link with the converged message server of the sender through a group control server.

5. The system according to claim 3, wherein the memory in the message storage server is further configured to send a notice message to a receiver user after storing the voice message.

6. The system according to claim 4, wherein the memory in the message storage server is further configured to send a notice message to a receiver user after storing the voice message.

* * * * *